United States Patent
Post et al.

(10) Patent No.: US 11,354,155 B1
(45) Date of Patent: Jun. 7, 2022

(54) SYSTEM AND METHOD FOR MAXIMIZING PROCESSOR AND SERVER USE

(71) Applicant: UIPCO, LLC, San Antonio, TX (US)

(72) Inventors: Nathan Lee Post, San Antonio, TX (US); Bryan J. Osterkamp, New Braunfels, TX (US); William Preston Culbertson, II, San Antonio, TX (US); Ryan Thomas Russell, San Antonio, TX (US); Ashley Raine Philbrick, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 198 days.

(21) Appl. No.: 16/571,300

(22) Filed: Sep. 16, 2019

Related U.S. Application Data

(60) Provisional application No. 62/811,573, filed on Feb. 28, 2019.

(51) Int. Cl.
| | |
|---|---|
| G06F 9/46 | (2006.01) |
| G06F 9/48 | (2006.01) |
| G06F 9/50 | (2006.01) |
| G06N 20/00 | (2019.01) |
| G06K 9/62 | (2022.01) |
| G06F 9/54 | (2006.01) |

(52) U.S. Cl.
CPC ............ *G06F 9/4881* (2013.01); *G06F 9/505* (2013.01); *G06F 9/5088* (2013.01); *G06F 9/544* (2013.01); *G06K 9/6256* (2013.01); *G06K 9/6267* (2013.01); *G06N 20/00* (2019.01)

(58) Field of Classification Search
CPC ........ G06F 9/4881; G06F 9/505; G06N 20/00
See application file for complete search history.

(56) References Cited

U.S. PATENT DOCUMENTS

| | | | |
|---|---|---|---|
| 6,199,154 B1* | 3/2001 | Witt | G06F 9/30021 712/205 |
| 9,684,541 B2* | 6/2017 | Weissmann | G06F 9/5083 |

* cited by examiner

*Primary Examiner* — Camquy Truong
(74) *Attorney, Agent, or Firm* — Plumsea Law Group, LLC

(57) ABSTRACT

A system and method for operating fewer servers near maximum capacity as opposed to operating more servers at low capacity is disclosed. Computational tasks are made as small as possible to be completed within the available capacity of the servers. Computational tasks that are similar may be distributed to the same computing node (including a processor) to improve RAM utilization. Additionally, workloads may be scheduled onto multicore processors to maximize the average number of processing cores utilized per clock cycle.

20 Claims, 7 Drawing Sheets

SYSTEM AND METHOD FOR MAXIMIZING PROCESSOR AND SERVER USE

CROSS-REFERENCE TO RELATED APPLICATIONS

This application claims the benefit of Provisional Patent Application No. 62/811,573 filed Feb. 28, 2019, and titled "System and Method for Maximizing Processor and Server Use," which is incorporated by reference herein in its entirety.

TECHNICAL FIELD

The present disclosure generally relates to computing systems, and in particular to computing systems with multicore processors.

BACKGROUND

Presently, computing systems are configured to distribute tasks among all processors and/or servers in a system. Specifically, computational workloads are often distributed over many servers that are configured to run at a relatively low capacity. For small scale systems, such a configuration may be sufficient. However, as the size of a system scales and computing costs (and space) become significant issues, it may be necessary to find more efficient computing strategies that involve operating servers and processors at a higher capacity.

There is a need in the art for a system and method that addresses the shortcomings discussed above.

SUMMARY

In one aspect, a method of scheduling computational tasks for a multicore processor includes receiving a plurality of computational tasks to be processed by the multicore processor, preparing a workload schedule that maximizes the average number of processing cores utilized per clock cycle over a predetermined period of clock cycles, and distributing workloads to the multicore processor according to the prepared workload schedule.

In another aspect, a method of distributing computational tasks to a first computing node and to a second computing node to improve the efficiency of RAM utilization includes receiving a set of computational tasks to be processed, using a machine learning algorithm to classify the tasks into a first group of tasks and a second group of tasks, and sending the first group of tasks to the first computing node and the second group of tasks to the second computing node.

In another aspect, a computational task scheduling system for a multicore processor includes a device processor and a non-transitory computer readable medium including instructions executable by the device processor to receive a plurality of computational tasks to be processed by the multicore processor, prepare a workload schedule that maximizes the average number of processing cores utilized per clock cycle over a predetermined period of clock cycles, distribute workloads to the multicore processor according to the prepared workload schedule.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide systems and methods for operating fewer servers near maximum capacity as opposed to operating more servers at low capacity. This goal may be achieved through multiple related strategies including putting related tasks in the same server cluster, and/or on the same processor if possible. This goal may be facilitated by making the tasks to be executed small enough to be completed within the available capacity of the servers. In some embodiments, application processes that generate the computational tasks may create the tasks in small sizes. In other embodiments, a system downstream of the application processes could parse incoming tasks/workload requests into smaller sub-tasks/workloads.

Additionally, the systems and methods also facilitate grouping similar computational tasks/workloads together to be completed by the same processor, since processing similar computational tasks may increase the amount of RAM that can be shared across processors (or cores) performing those tasks. In order to maximize computational capacity at the processor lever, the systems and methods include provisions for scheduling computational workloads so as to maximize the average number of processing cores used at each clock cycle (where the average is taken over a multi-cycle period).

Figure 1:
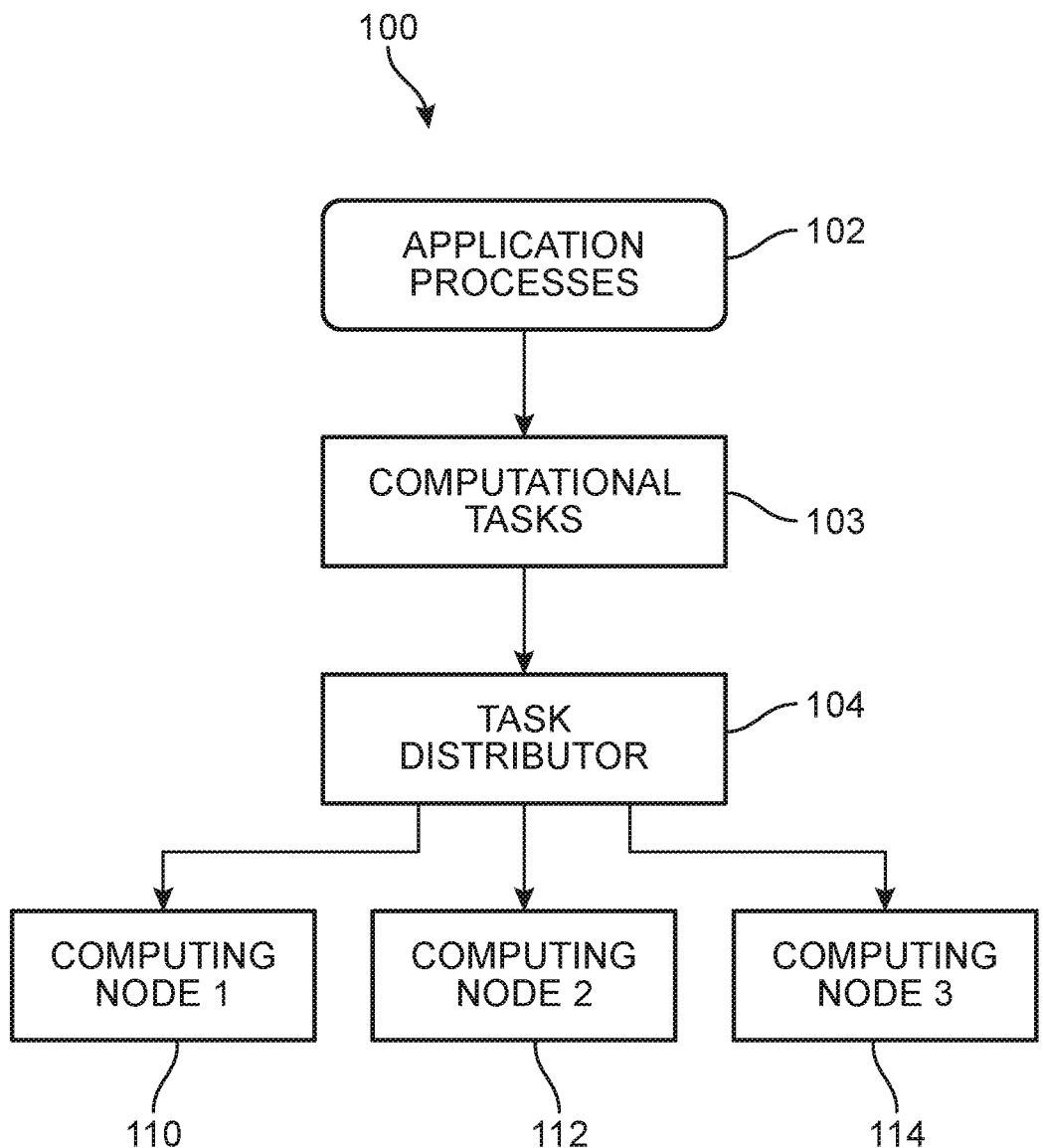
FIG. 1 is a schematic view of a system for distributing computational tasks to multiple different computing nodes, according to an embodiment.

FIG. 1 is a schematic view of a system 100 for distributing computational tasks to two or more computing nodes, according to an embodiment. As used herein, the term "computational task" refers to a finite sized computational workload that must be processed using a CPU, GPU or other processing unit.

In the exemplary embodiment, computational tasks 103 are generated by one or more application processes 102. Application processes 102 may be running on one or more computing systems. In one embodiment, application processes 102 could be located in a single computing system (such as a server or virtual machine). In other cases, application processes 102 could be running on two or more different systems. In some cases, application processes 102 could be processes running on distinct clients.

The computational tasks 103 (also referred to as computational requests) are sent to a task distributor 104. Task distributor 104 analyzes the computational tasks and selects one or more computing nodes to process each task. In some embodiments, task distributor 104 may be a load balancer that acts to distribute computational workloads over a set of computing nodes to avoid overloading any particular node. In other embodiments, task distributor 104 may distribute tasks according to features such as "task similarity," which may be different from conventional load balancers, as discussed in further detail below.

Task distributor 104 sends tasks to one of multiple different computing nodes. In the exemplary embodiment, three computing nodes (a first computing node 110, a second computing node 112 and a third computing node 114) are depicted. However, other embodiments could include only two nodes, or more than three nodes.

As used herein, the term "computing node" may refer to a unit for processing computational tasks or workloads. Each node could comprise at least one processor along with memory. In some embodiments, each of these computing nodes comprises a single server with a single processor. The processor may itself comprise multiple processing cores, as described below. However, in other embodiments, each computing node could comprise multiple servers (and/or processors). In other embodiments, each node could comprise a server cluster.

Figure 2:
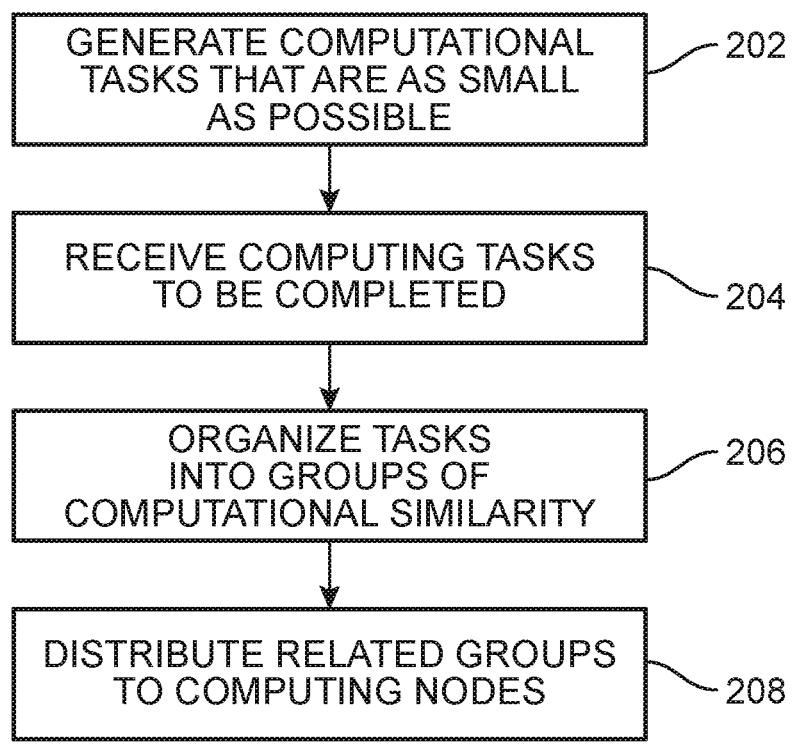
FIG. 2 is a schematic process for distributing computational tasks to different computing nodes, according to an embodiment.

FIG. 2 is a schematic process that may be performed by one or more application processes and a task distributor, according to an embodiment. Starting at step 202, one or more application processes may generate computational tasks to be performed by one or more computing nodes. Specifically, the application processes may be configured to generate computational tasks that are as small as possible. As an example, where it is feasible, an application could generate two tasks that require three processing cores each, rather than a single task that requires six processing cores. As another example, an application could generate three tasks that each only require one processing core, rather than a single task that requires three processing cores. As described in further detail below, generating tasks that are smaller (that is, tasks that require fewer processing cores to be completed) may allow for greater processor utilization per clock cycle.

Next, in step 204, a task distributor may receive computational tasks to be completed. In step 206, the task distributor may organize the tasks into groups, where each group comprises tasks that are computationally similar. As an example of computational similarity, two tasks may be more similar if they rely on similar information stored in RAM during processing. This may allow RAM to be shared between processors, or between cores within a processor, when two similar tasks are processed simultaneously (or near simultaneously).

Once the tasks have been grouped according to computational similarity, the tasks may be distributed to the computational nodes in step 208. Specifically, each group of tasks may be sent to a single node so that tasks that are computationally similar may all be processed at the same computational node, thereby increasing the amount of RAM can be shared among processors or cores, as compared to the amount of RAM that could be shared by unrelated tasks. In some cases, different groups of tasks are sent to different nodes. In other cases, different groups could be sent to the same node, but at different times.

It may be appreciated that in addition to considering computational similarity, a task distributor may also consider other factors in forming groups and/or in distributing tasks to computational nodes. For example, if a group of tasks is too large, sending all the similar tasks to a single node may not be feasible. Therefore, other factors could also be considered in deciding where to distribute different workloads. These include any suitable factors used by conventional load balancers in distributing workloads among multiple computing nodes.

Figure 3:
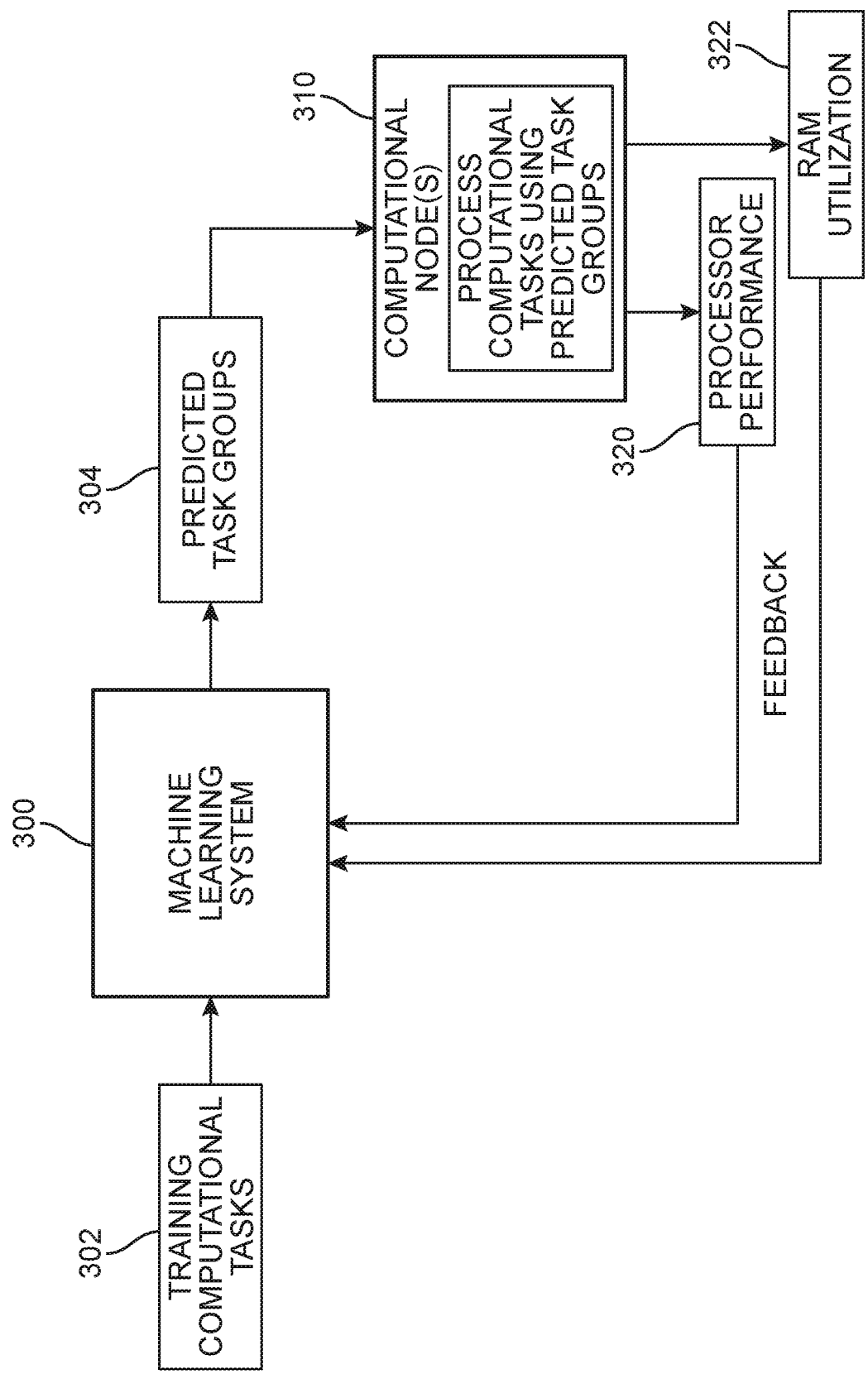
FIG. 3 is a schematic view of a process for training a machine learning system to classify computational tasks into different groups.

FIG. 3 is a schematic view of a machine learning system 300 that is configured to group tasks according to computational similarity. Specifically, machine learning system 300 receives a set of training computational tasks 302 and outputs predicted task groups 304. Then, the training computational tasks are processed by one or more computing nodes 310 according to the predicted task groups 304. The system them uses the performance of the computing nodes, including both processor performance 320 and RAM utilization 322 as feedback. Using this configuration, the machine learning system 300 learns to divide computational tasks into task groups that optimize performance, including processor performance and/or RAM utilization. For example, the system may learn to group tasks in order to maximize the amount of RAM that can be shared across processors (or cores).

Figure 4:
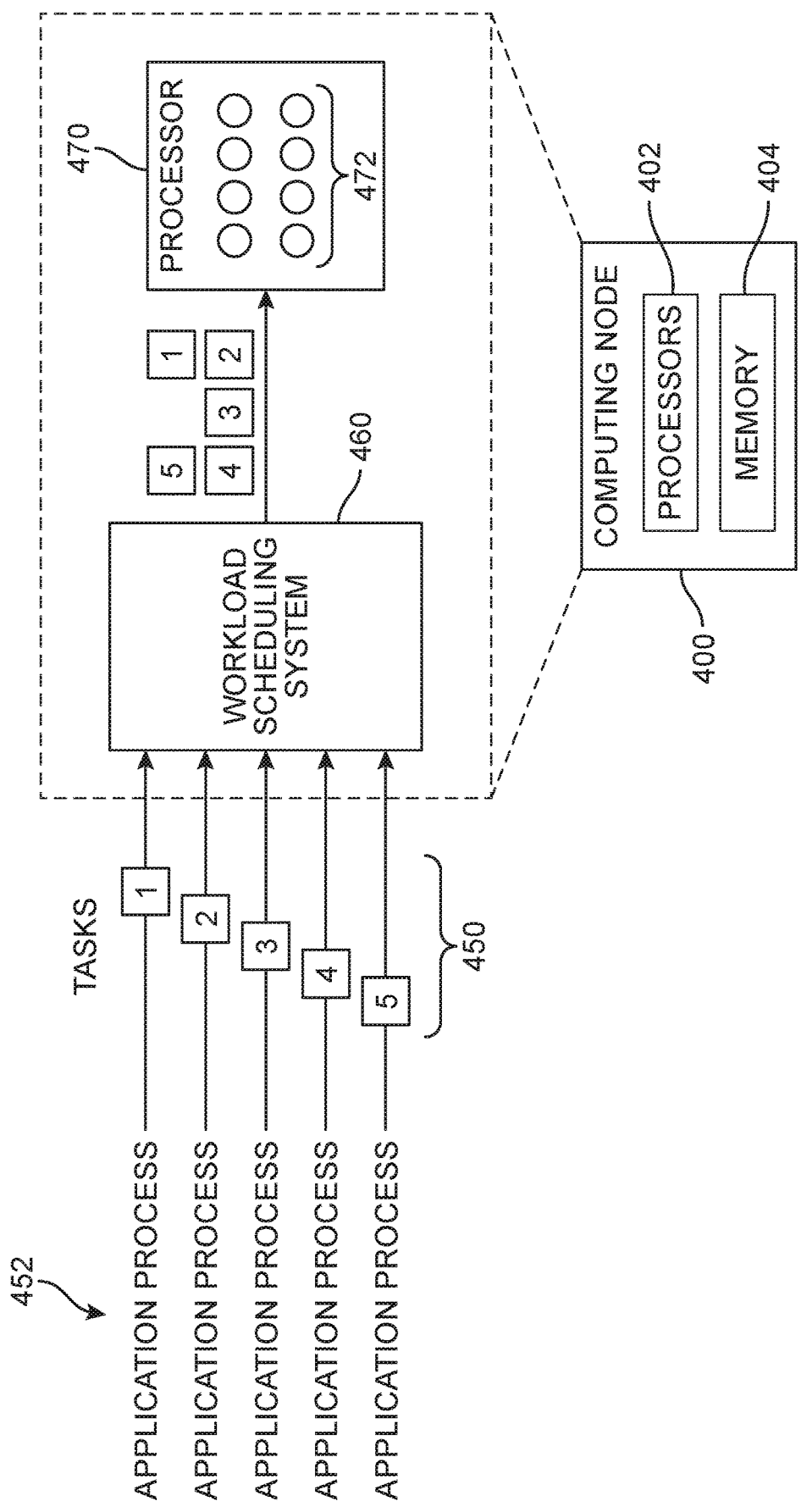
FIG. 4 is a schematic view of a system for scheduling workloads on a multicore processor, according to an embodiment.

FIG. 4 is a schematic view of an exemplary computing node 400 that may receive and process computational tasks that have been delivered by a task distributor. In this exemplary embodiment, computing node 400 includes one or more processors 402 and memory 404. Memory 404 may comprise a non-transitory computer readable medium. Instructions stored on the non-transitory computer readable medium may be executed by the one or more processors 402. Memory 404 may include any type of short-term and/or long-term memory (or storage), including Random Access Memory (RAM), micro-SD memory and Solid State Drives (SSD). When computing node 400 is a single processor, memory 404 could comprise one or more memory caches.

In the exemplary embodiment, some processors may be multicore processors. Multicore processors comprise a single computing component that includes two or more distinct processing units, referred to as cores. Using a multicore processor, multiple different tasks can be run simultaneously (multiprocessing), a single task can be completed using multiple cores processing in parallel (parallel processing), and/or a combination of multiprocessing and parallel processing can be accomplished.

As seen in the schematic enlarged view within FIG. 4, real-time computational tasks 450 are delivered to computing node 400. These tasks, which may also be referred to as computational workloads, or computational workload requests, originate at one or more application processes 452. These application processes 452 may be running on the same computing node, or may be running on a different computing node.

As seen in FIG. 4, computational tasks 450 arrive at a workload scheduling system 460. Workload scheduling system 460 determines a schedule for passing tasks (workloads) to a processor 470. Because processor 470 has multiple processing cores 472, workload scheduling system 460 may select a workload schedule according to the number of cores that each task utilizes.

Figure 5:
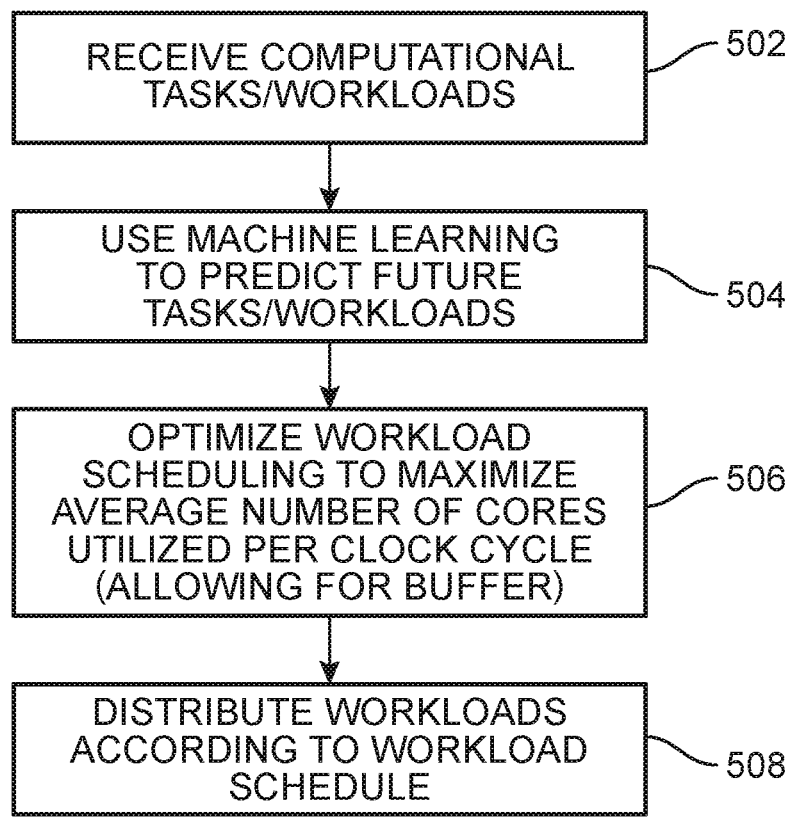
FIG. 5 is a schematic view of a process for scheduling workloads on a multicore processor, according to an embodiment.

FIG. 5 is a schematic view of a process for distributing workloads to multicore processors, according to an embodiment. In step 502, multiple computational tasks (or workloads) may be received. In some cases, these tasks may be received from a task distributor that distributes tasks among two or more computational nodes, as indicated schematically in FIG. 1.

In step 504, machine learning can be used to predict future tasks/workloads. As one example, a neural network could be used to predict possible future tasks/workloads based on a set of currently queued tasks/workloads. This step of predicting future workloads may be necessary for the workload scheduling system 460 to build an optimal workload schedule over multiple clock cycles.

It may be appreciated that any suitable machine learning algorithms could be used to predict future tasks and/or workloads. Exemplary machine learning algorithms include, but are not limited to: supervised learning algorithms, unsupervised learning algorithms, and reinforcement learning algorithms.

Next, in step 506, the workload schedule can be optimized to maximize the average number of processing cores utilized per clock cycle of the processor. More specifically, this maximum may be determined while considering a desired buffer, so that the maximum may be less than the total number of processing cores available. As an example, if a processor has eight cores and a single core is used for a buffer, the average number of cores utilized per clock cycle would be capped at seven cores.

In step 508, the workloads (tasks) can be distributed according to a workload schedule. That is, the workload scheduling system can send workloads (tasks) to the processor according to the workload schedule.

Figure 6:
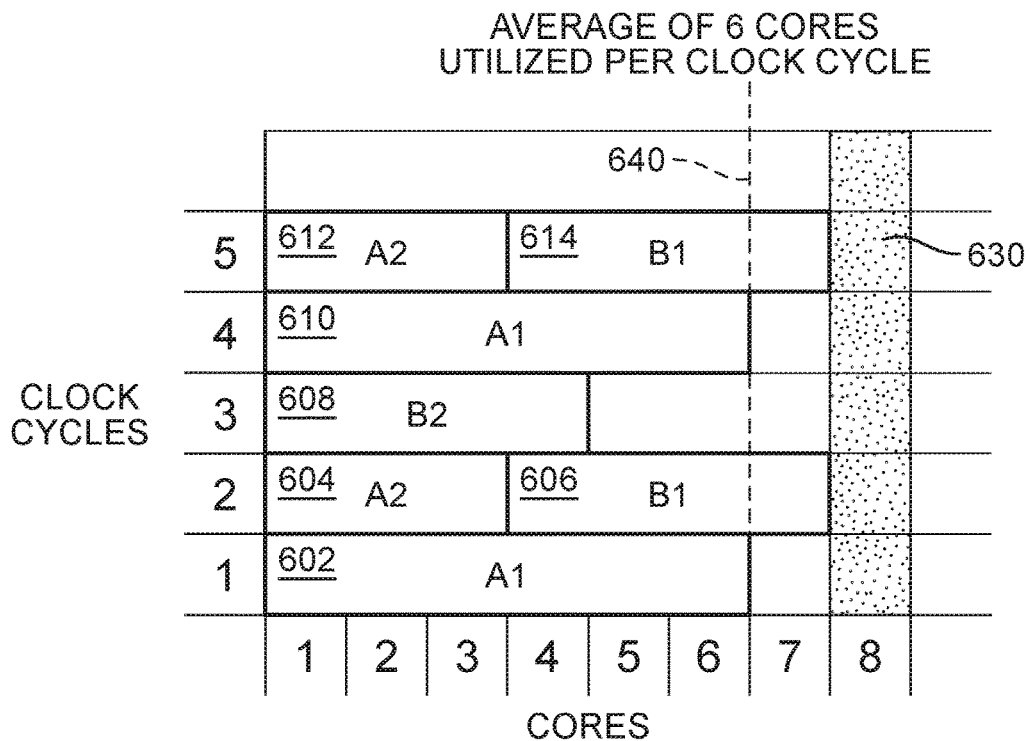
FIG. 6 is a schematic view of a workload schedule for a multicore processor, according to one embodiment.
Figure 7:
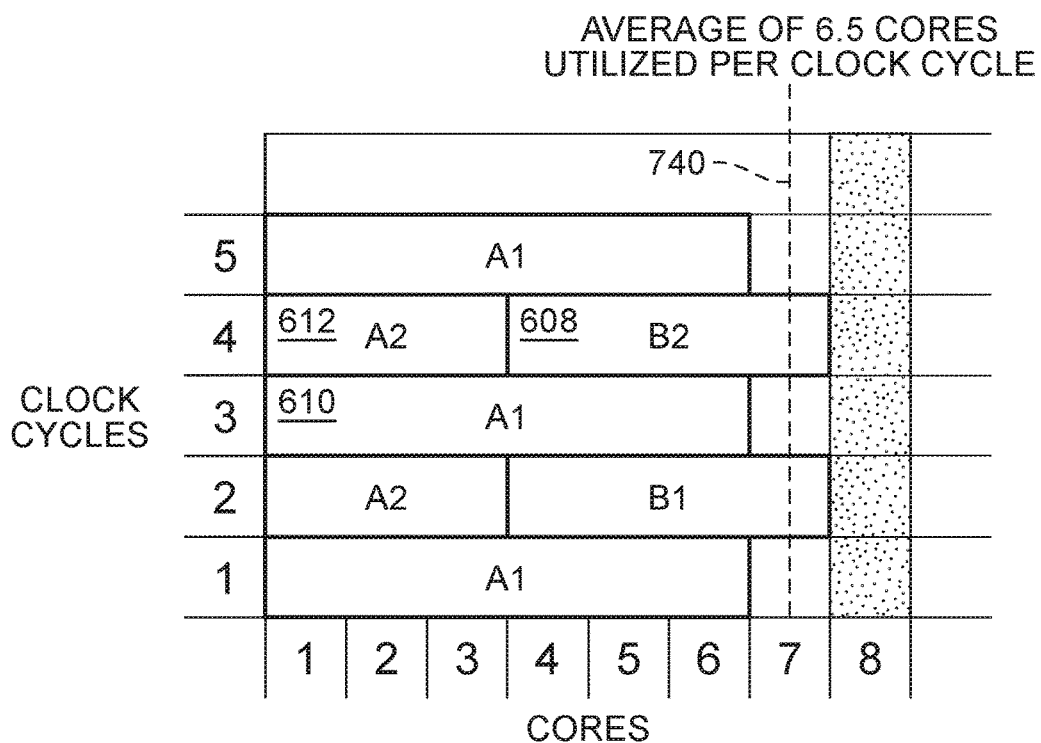
FIG. 7 is a schematic view of a workload schedule for a multicore processor, according to another embodiment.
Figure 8:
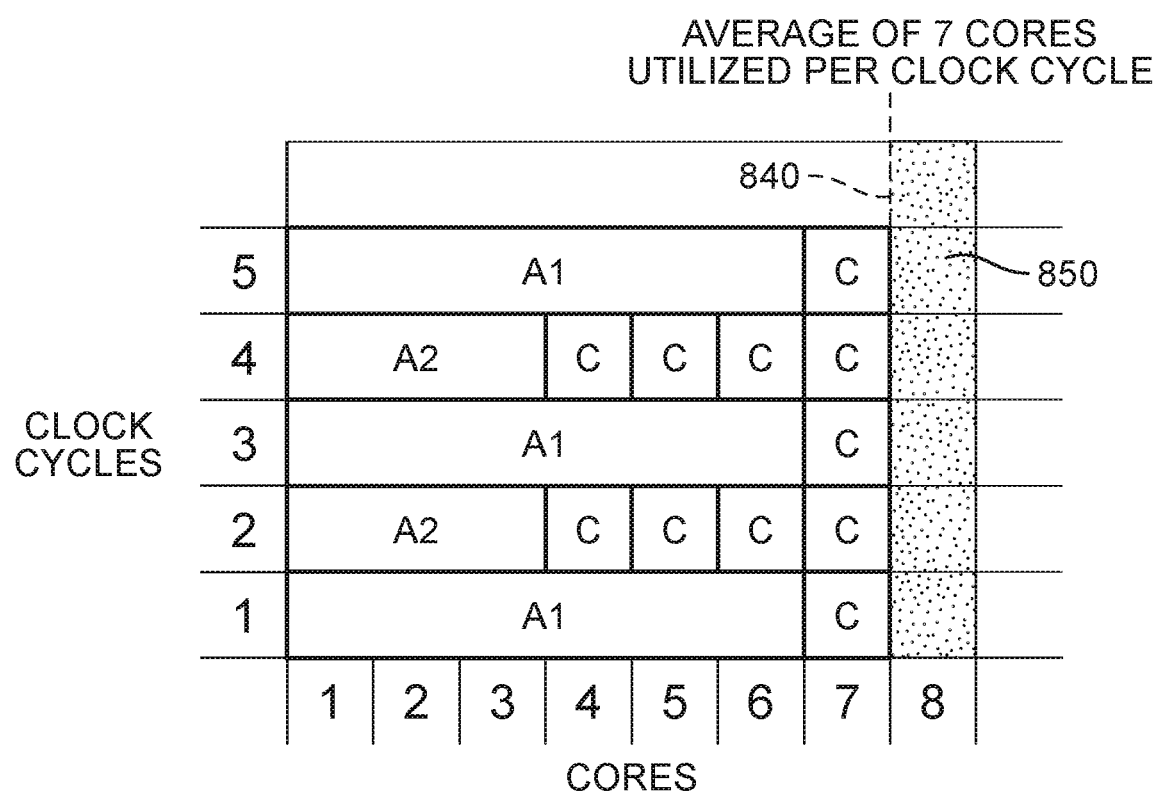
FIG. 8 is a schematic view of a workload schedule for a multicore processor that includes some workloads requiring only a single core, according to one embodiment.

To clarify the idea of an average number of processing cores utilized per clock cycle, FIGS. 6 and 7 depict two different ways of scheduling workloads. In each of FIGS. 6 and 7, the horizontal axis represents the number of processing cores used, while the vertical axis corresponds to a series of sequential clock cycles (1, 2, 3, etc.).

In both FIGS. 6 and 7, a particular application requires a first task 602 ("A1") and a second task 604 ("A2") to be processed. Next, another application requires a third task 606 ("B1") and a fourth task ("B2") to be processed. These same sets of tasks (that is, A1 and A2, and also B1 and B2) are then processed again. A similar pattern may repeat over many clock cycles.

In FIG. 6, the computational tasks are scheduled according to a simple rule: load as many tasks as will fit into the next clock cycle, while allowing for a buffer 630. In this case, the buffer is simply ensuring one core remains free at each clock cycle. Thus, in this case first task 602 is processed at the first clock cycle. Because second task 604 will not fit in the same (first) clock cycle, second task 604 is processed at the second clock cycle along with third task 606, since second task 604 and third task 606 together utilize 7 cores. In the third clock cycle fourth task 608 is processed by itself. This process is repeated at the next clock cycle with fifth task 610, which is identical to first task 602. Sixth task 612, which is identical to second task 604, is then processed at the next clock cycle along with seventh task 614. In all, processing these seven tasks (including some that are identical) requires five clock cycles.

FIG. 7 depicts an embodiment where the computational tasks have been scheduled according to the process described in FIG. 5. Specifically, the tasks have been scheduled to maximize the average number of processing cores utilized per clock cycle (while allowing for a buffer). In contrast to the schedule depicted in FIG. 6, therefore, the order of some tasks has been switched to achieve this goal. Specifically, fourth task 608 has been loaded after fifth task 610. This allows sixth task 612 ("A2") and fourth task 608 ("B2") to be loaded together in the same clock cycle. By making this change to the workload schedule, the average number of processing cores utilized at each clock cycle is increased. It may be appreciated that in order to build this workload schedule, the system may need to make predictions about future tasks. In particular, this system may predict that the series of tasks A1, A2, B1, and B2 may be repeated over many cycles, thereby allowing the system to reorder the tasks over multiple cycles compared to the schedule shown in FIG. 6. Such predictions may be achieved using machine learning, as described above.

As seen in FIG. 6, the average number of processing cores utilized per clock cycle (indicated graphically as average 640) has a value of approximately 6. That is, this particular workload schedule results in an average of 6 processing cores being utilized over a period of five clock cycles. By contrast, in the configuration of FIG. 7, the average number of processing cores utilized per clock cycle (indicated graphically as average 740) has a value of approximately 6.5. That is, this particular workload schedule results in an average of 6.5 processing cores being utilized over a period of five clock cycles.

FIG. 7 indicates another embodiment of a processor workload schedule. In this embodiment, computational tasks arrive as both multicore tasks ("A1" and "A2") and single core tasks ("C1"). Accordingly, the schedule can be constructed so that the single processor tasks are used to fill in all available capacity (while allowing for the buffer) at each clock cycle. Thus, in this example, the average number of processing cores utilized per clock cycle (indicated graphically as average 840) has a value of approximately 7, which is the maximum that can be achieved given the existing buffer 850.

It may be appreciated that the average number of processing cores utilized per clock cycle may vary according to the period (number of clock cycles) considered. Thus, though the exemplary discussion above describes averages over five clock cycles, other embodiments can maximize the average number of cores used over any other predetermined period(s).

The process described above and depicted in FIG. 5 may be thought of as "dynamic workflow defragging." That is the workloads are dynamically allocated in a pattern that limits "dead space" (unused processing cores) in the workload schedule.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of scheduling computational tasks for a multicore processor, the method comprising:
receiving a plurality of computational tasks to be processed by the multicore processor;
preparing a workload schedule that maximizes the average number of processing cores utilized per clock cycle over a predetermined period of clock cycles; and
distributing workloads to the multicore processor according to the prepared workload schedule.

2. The method according to claim 1, wherein the predetermined period of clock cycles comprises at least two clock cycles.

3. The method according to claim 1, wherein the workload schedule is prepared to maximize the average number of processing cores utilized per clock cycle while maintaining a buffer.

4. The method according to claim 3, wherein the buffer comprises at least one processing core.

5. The method according to claim 1, wherein preparing the workload schedule comprises predicting future computational tasks.

6. The method according to claim 5, wherein the method includes using at least one machine learning algorithm to predict the future computational tasks.

7. The method according to claim 1, wherein the multicore processor comprises at least two processing cores.

8. The method according to claim 1, wherein the multicore processor comprises at least four processing cores.

9. The method according to claim 1, wherein at least one of the computational tasks can be completed using a single processing core.

10. The method according to claim 1, wherein at least one of the computational tasks requires two or more processing cores to be completed.

11. A computational task scheduling system for a multicore processor, comprising:
a device processor; and a non-transitory computer readable medium including instructions executable by the device processor to:

receive a plurality of computational tasks to be processed by the multicore processor;

prepare a workload schedule that maximizes the average number of processing cores utilized per clock cycle over a predetermined period of clock cycles; and distribute workloads to the multicore processor according to the prepared workload schedule.

12. The computational task scheduling system according to claim 11, wherein the predetermined period of clock cycles comprises at least two clock cycles.

13. The computational task scheduling system according to claim 11, wherein the workload schedule is prepared to maximize the average number of processing cores utilized per clock cycle while maintaining a buffer.

14. The computational task scheduling system according to claim 11, wherein the buffer comprises at least one processing core.

15. The computational task scheduling system according to claim 11, wherein preparing the workload schedule comprises predicting future computational tasks.

16. The computational task scheduling system according to claim 15, wherein the method includes using at least one machine learning algorithm to predict the future computational tasks.

17. The computational task scheduling system according to claim 16, wherein the machine learning algorithm is trained using training computational tasks.

18. The computational task scheduling system according to claim 11, wherein the instructions are executable to organize the incoming computational tasks into groups, wherein each group comprises tasks that are computationally similar.

19. The computational task scheduling system according to claim 18, wherein the computational tasks that rely on similar information stored in RAM are organized into the same group.

20. The computational task scheduling system according to claim 17, wherein different groups are sent to the multi-core processor at different times.

* * * * *